(12) United States Patent
Padhi et al.

(10) Patent No.: US 11,269,096 B2
(45) Date of Patent: Mar. 8, 2022

(54) MITIGATION OF DISTRIBUTED ACOUSTIC SENSING GAUGE LENGTH EFFECTS USING INVERSION

(71) Applicant: Halliburton Energy Services, Inc., Houston, TX (US)

(72) Inventors: Amit Padhi, Houston, TX (US); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 409 days.

(21) Appl. No.: 16/464,638

(22) PCT Filed: Jul. 10, 2018

(86) PCT No.: PCT/US2018/041354
§ 371 (c)(1),
(2) Date: May 28, 2019

(87) PCT Pub. No.: WO2020/013806
PCT Pub. Date: Jan. 16, 2020

(65) Prior Publication Data
US 2020/0333487 A1    Oct. 22, 2020

(51) Int. Cl.
*G01V 1/22* (2006.01)
*G01V 1/36* (2006.01)
*G01V 1/42* (2006.01)

(52) U.S. Cl.
CPC ............ *G01V 1/226* (2013.01); *G01V 1/368* (2013.01); *G01V 1/42* (2013.01); *G01V 2210/161* (2013.01)

(58) Field of Classification Search
CPC ......... G01V 1/226; G01V 1/368; G01V 1/42; G01V 2210/161; G01V 2210/24; G01V 2210/64; G01V 2210/121; G01V 2210/1295; G01V 2210/1429; G01V 1/208; G01V 1/28
(Continued)

(56) References Cited

U.S. PATENT DOCUMENTS 9,702,244 B2    7/2017  Willis et al.
2012/0035854 A1  2/2012  Kragh et al.
(Continued)

FOREIGN PATENT DOCUMENTS

WO    2016011431 A1    1/2016
WO    2016020654 A1    2/2016

OTHER PUBLICATIONS

PCT Application Serial No. PCT/US2018/041354, International Search Report & Written Opinion, dated Apr. 2, 2019, 8 pages.
(Continued)

*Primary Examiner* — Daniel L Murphy
(74) *Attorney, Agent, or Firm* — Gilliam IP PLLC

(57) ABSTRACT

A method to generate a vertical seismic profile includes acquiring a set of distributed acoustic sensing measurements from a set of overlapping measurement channels on an optical fiber, wherein each of the set of distributed acoustic sensing measurements are measured at a gauge length. The method also includes generating a set of virtual seismic measurements corresponding with subdivisions in the set of overlapping measurement channels based on the set of distributed acoustic sensing measurements and generating the vertical seismic profile based on the set of virtual seismic measurements.

20 Claims, 7 Drawing Sheets

(58) Field of Classification Search
USPC .......................................................... 367/25
See application file for complete search history.

(56) References Cited

U.S. PATENT DOCUMENTS

2014/0174826 A1   6/2014   Cayeux
2016/0245077 A1   8/2016   Willis et al.

OTHER PUBLICATIONS

Kanzow, et al., "Levenberg-Marquardt Methods with Strong Local Convergence Properties for Solving Nonlinear Equations with Convex Constraints", Journal of Computational and Applied Mathematics, vol. 172, Dec. 2004, pp. 375-397.
Podgornova, et al., "On Full-Waveform Modeling and Inversion of Fiber-Optic VSP Data", Society of Exploration Geophysicists, Technical Program Expanded Abstracts, 2017, pp. 6039-6043.
Golub, et al. "Tikhonov Regularization and Total Least Squares", Siam J. Matrix Anal. Appl., Society for Industrial and Applied Mathematics, 1999, vol. 21 No. 1, pp. 185-194.

FIG. 2

MITIGATION OF DISTRIBUTED ACOUSTIC SENSING GAUGE LENGTH EFFECTS USING INVERSION

BACKGROUND

The disclosure generally relates to the monitoring of hydrocarbon reservoirs. In particular, this disclosure relates to systems and methods for monitoring a reservoir using Distributed Acoustic Sensing (DAS).

Acoustic sensing based on DAS uses backscatter properties of an optical fiber's core and can spatially detect disturbances that are distributed along the fiber length. Externally-generated acoustic disturbances can create very small strain changes to optical fibers. Data generated by current DAS systems can include artifacts. These artifacts can be caused by the method of measurement used by the DAS systems, such as by the use of certain gauge lengths which allows the performance of optical interferometric measurements.

BRIEF DESCRIPTION OF THE DRAWINGS

Embodiments of the disclosure can be better understood by referencing the accompanying drawings.

FIG. 2 is a schematic diagram of a set of measurement channels, their corresponding positions in sections of an optical fiber, and their representation in a linear system.

DESCRIPTION OF EMBODIMENTS

Figure 1:
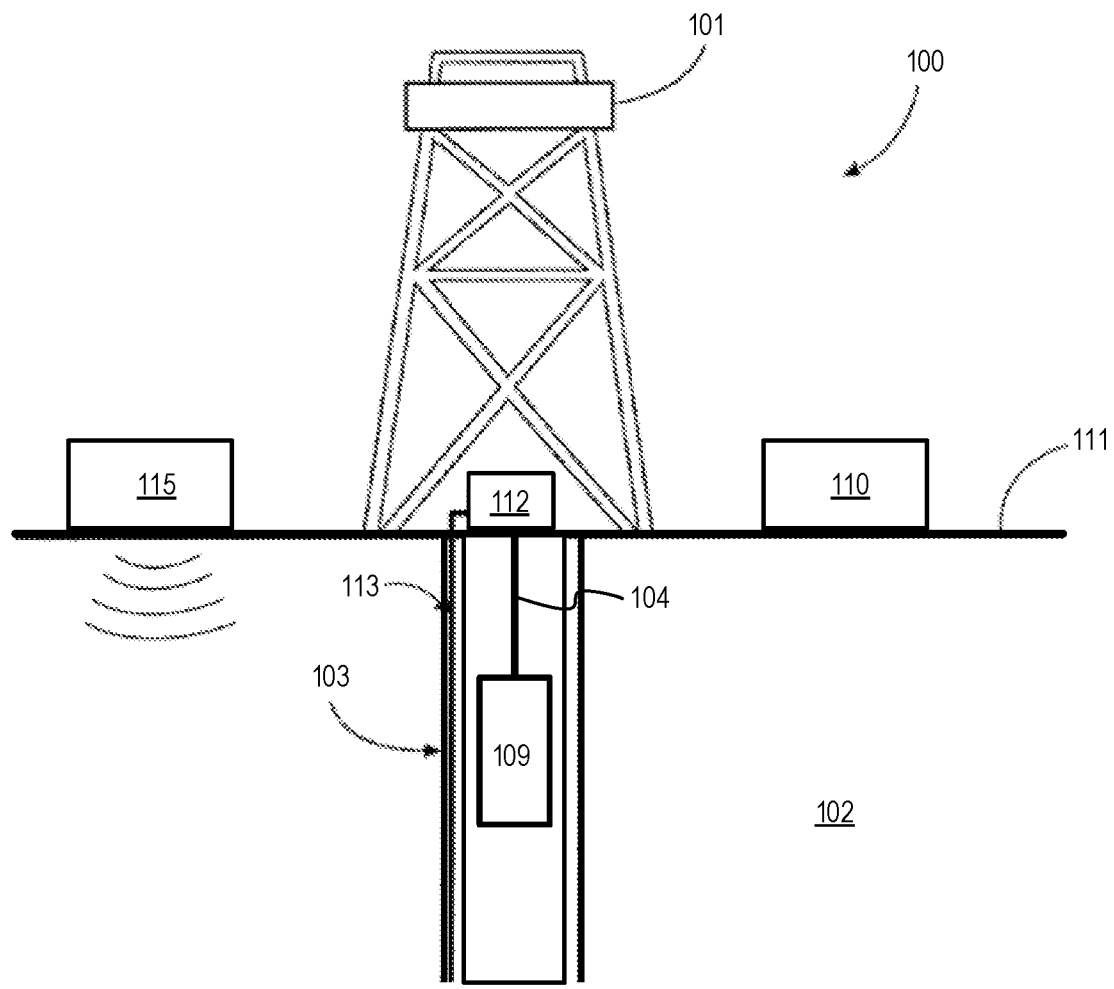
FIG. 1 is an elevation view of an onshore wireline system operating a wireline tool that includes a distributed acoustic sensing system acquiring vertical seismic profile data.

The description that follows includes example systems, methods, techniques, and program flows that embody embodiments of the disclosure. However, it is understood that this disclosure can be practiced without these specific details. For instance, this disclosure refers to using a Levenberg-Marquadt inversion in illustrative examples. Embodiments of this disclosure can instead be applied to other nonlinear inversions such as gauss-newton inversion, conjugate gradient inversion, and inversions using genetic algorithms. In other instances, well-known instruction instances, protocols, structures and techniques have not been shown in detail in order not to obfuscate the description.

The present disclosure describes a method for mitigating gauge length effects in distributed acoustic sensing (DAS) data signals. DAS data collection systems rely on detecting phase changes in backscattered light signals to determine changes in strain (e.g., caused by acoustic waves) along the length of optical fiber. To measure the phase changes, measurements of light signals from two different points along the optical fiber are taken to determine an average amount of strain over that distance. The distance between these two points can be referred to as the gauge length, and a section of an optical fiber with a gauge length centered at a particular depth can be referred to as a measurement channel. As described below, the measurements can be taken from the two different locations using at least one of hardware (e.g., using interferometers with physical gauge lengths) and software operations (e.g., comparing backscattered signals received at different times).

The gauge length in DAS data collection systems can have different effects on the data signals collected by the system. For example, longer gauge lengths can produce data signals with better signal to noise ratios. However, longer gauge lengths can have more loss in spectral fidelity than shorter gauge lengths due to the averaging that takes place between two points farther apart from one another than in shorter gauge length embodiments. The gauge length chosen can also cause artifacts in the collected DAS data, as will be shown below. For example, reverberations or ringing can be present in the collected DAS data, and can be especially apparent in slower moving seismic events with longer gauge lengths. The spectral fidelity loss associated with longer gauge lengths and noise associated with shorter gauge lengths can each be known as a type of gauge length effect (GLE). Moreover, attempts to mitigate these GLEs can require the use of multiple measurements at different gauge lengths, which can involve complex hardware, physical adjustments for different gauge lengths, and/or greater measurement time.

Accordingly, embodiments of the present disclosure can apply one or more operations on DAS data collected at a single gauge length in order to mitigate these GLEs in a DAS data collection system. Embodiments can generate virtual seismic measurements for subdivisions of gauge lengths using DAS data. In some embodiments, this DAS data can be acquired at a single gauge length with a single optical fiber, increasing the speed of data acquisition and interpretation. Some embodiments can apply one or more inversion operations to the virtual seismic measurements and/or DAS data to generate a GLE-mitigated seismic profile. The GLE-mitigated seismic profile can be provided to other operations for purposes such as seismic interpretation and reservoir forecasting. Alternatively, or in addition, some embodiments further use the GLE-mitigated seismic profile to plan/modify a drilling operation or a well treatment operation such as flooding, acidizing, or fracturing. For example, in response to a GLE-mitigated seismic profile that shows the presence of a geological feature (e.g., a fault, fracture network, salt dome, etc.), some embodiments can modify a drilling operation. Modifying a drilling operation can include changing a drill bit to move in a different direction or changing a drilling speed (e.g., stopping a drill bit, slowing a drill bit, etc.). As another example, in response to a GLE-mitigated seismic profile showing the presence of different geological layers including a target geological layer, some embodiments can initiate/modify a well treatment operation to begin stimulation at the target geological layer.

To facilitate a better understanding of the present disclosure, the following examples of certain embodiments are given. In no way should the following examples be read to limit, or define, the scope of the disclosure. Embodiments of the present disclosure can be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments can be applicable, for example, to logging data acquired with wireline, slickline, and logging while drilling/measurement while drilling (LWD/MWD). Certain embodiments can be applicable to subsea and/or deep sea wellbores.

Example Well Systems

FIG. 1 is an elevation view of an onshore wireline system operating a wireline tool that includes a distributed acoustic sensing system acquiring vertical seismic profile data. A wireline system 100 includes a rig 101 located at a surface 111 and positioned above a wellbore 103 within a subterranean formation 102. The wireline system 100 can include a wireline 104 supporting a wireline tool 109 which can collect various types of information about the wellbore 103 and the subterranean formation 102 such as porosity, resistivity, hydrocarbon presence, gas presence, etc. A control unit 110 located at the surface 111 can include a processor and memory device and can communicate with elements of the wireline tool 109. A seismic source 115 and a DAS system 112 can be placed at the surface 111. The DAS system 112 can be coupled to an optical fiber 113 that is positioned within a portion of the wireline system 100. The DAS system 112 can collect DAS measurement values along the length of the optical fiber 113 while the wireline tool 109 is in motion. In addition, the DAS system 112 can collect DAS measurement values along the length of the optical fiber 113 while the wireline tool 109 is stationary. Furthermore, while the optical fiber 113 is shown to be deployed separately from the wireline 104, other embodiments can include an optical fiber deployed along with (e.g. attached to) a wireline. In addition, other embodiments can include an optical fiber deployed behind a well casing, strapped to a tubing, and/or deployed within or along a coiled tubing. Other embodiments can also include an optical fiber deployed to be free hanging within a wellbore.

Figure 2:
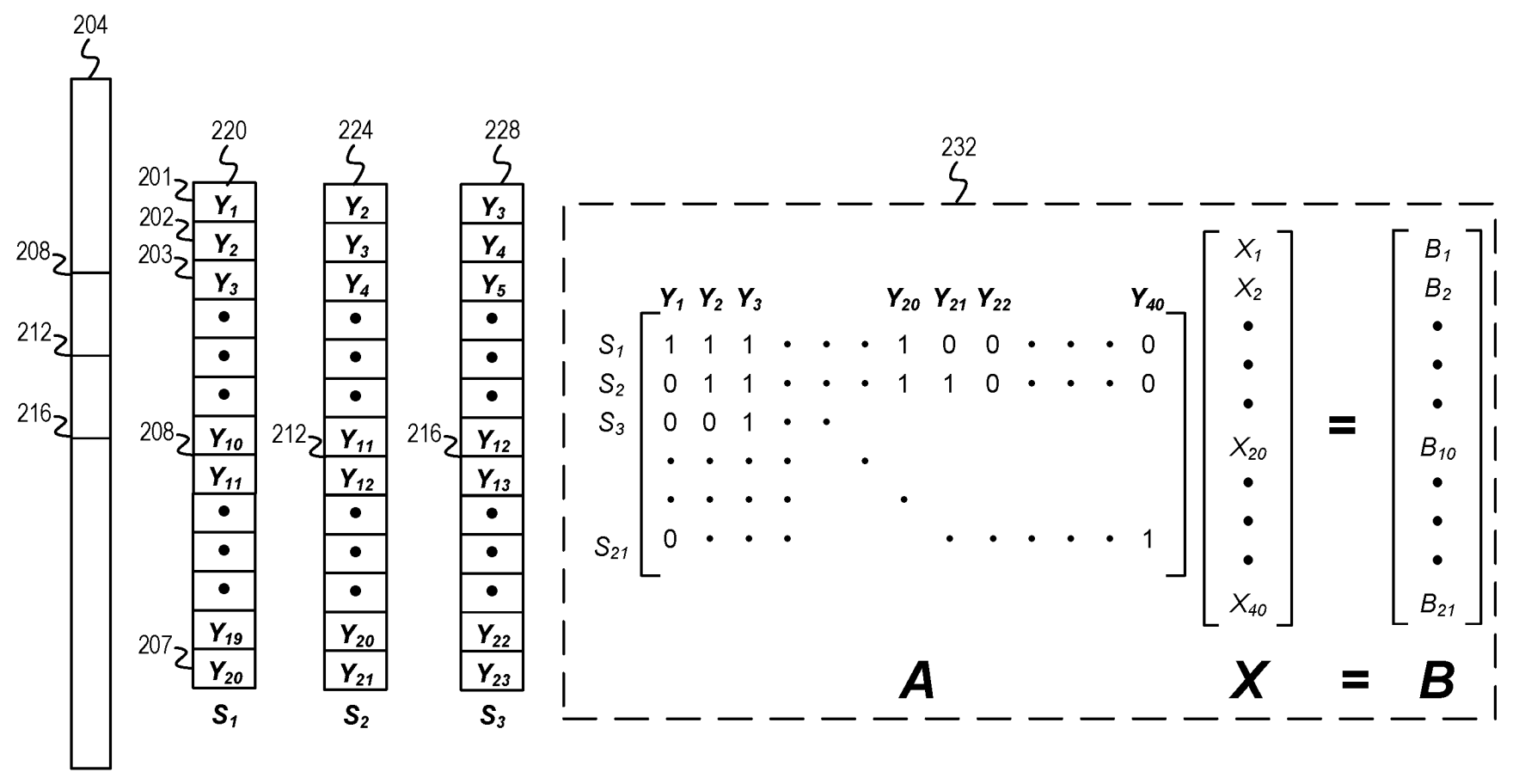

FIG. 2 is a schematic diagram of a set of measurement channels, their corresponding positions in sections of an optical fiber, and their representation in a linear system. Measurement channel positions 208, 212, and 216 along an optical fiber 204 are separated from their adjacent measurement channel positions by defined-length intervals. In this example, the defined-length interval is one meter. In other examples, the defined-length interval can be less than or greater than one meter. Each of the measurement channel positions 208, 212, and 216 are measured with a gauge length of 20 meters and have corresponding DAS measurement values $B_1$, $B_2$, and $B_3$. These distributed acoustic sensing measurements 232 can be used to generate virtual seismic measurements.

In this example, each of the optical fiber sections $S_1$ 220, $S_2$ 224, and $S_3$ 228 have a length of 20 meters and are divided into 20 subdivisions, wherein each subdivision is one meter long. In other examples, the optical fiber sections can have different lengths and/or be divided into a different number of subdivisions. The optical fiber section $S_1$ 220 is centered around the measurement position 208. The optical fiber section $S_2$ 224 is centered around the measurement position 212. The optical fiber section $S_3$ 228 is centered around the measurement position 216. Each of the positions $Y_j$ represent a subdivision position, wherein j is an index from 1 to n, and wherein n is the total number of subdivisions in an optical fiber section.

The virtual seismic measurements for each of the subdivisions can be determined based on Equation 1 below:

$$B_{Z_i} = \int_{Z_i-Z_{GL}/2}^{Z_i+Z_{GL}/2} \epsilon_{zz} dz \quad (1)$$

$B_{Z_i}$ is a DAS measurement value at a particular defined measurement channel position $Z_i$ on the optical fiber. The measurement channel position $Z_i$ has an index value of i. $Z_i+Z_{GL}/2$ is the position at half of the gauge length above the position $Z_i$. $Z_i-Z_{GL}/2$ is the position at half of the gauge length below the position $Z_i$. $\epsilon_{zz}$ is the strain of the subdivision being measured.

Equation 1 can be discretized into the approximated summation form shown in Equation 2 below, in which each value of $[\epsilon_{zz} dz]_j$ represents an integrand approximation for the measurement at the subdivision position $Y_j$:

$$B_{Z_i}=[\epsilon_{zz}dz]_1+[\epsilon_{zz}dz]_2+ \ldots +[\epsilon_{zz}dz]_n \quad (2)$$

This approximated signal can be simplified into the form at Equation 3, wherein a virtual seismic measurement can be represented as $x_j$ for the j-th value:

$$B_{Z_i}=x_1+x_2+ \ldots +x_n \quad (3)$$

The use of multiple measurement channels with overlapping section lengths provide a way to determine the virtual seismic measurements of the subdivisions in a segment of an optical fiber, wherein the segment is longer than a measurement channel section. As shown in the linear system 232, some embodiments can use a set of 21 measurement channels, each measured at a gauge length of 20 meters. The segment spanned by the overlapping sections of the 21 measurements is 40 meters because each section length is equal to the gauge length of 20 meters. This segment can be divided into 40 one-meter-long subdivisions. The linear system 232 is arranged in the form "AX=B" and combines applications of Equation 3 for the set of 21 measurement channels spanning across the 40 subdivisions. The vector B includes each of the 21 DAS measurement values corresponding with each i-th measurement channel position. The vector X includes each of the virtual seismic measurements $X_j$ corresponding with the subdivision centered around $Y_j$. Each i-th row of array A represents a particular measurement channel having an index $S_i$ and each column of A represents the j-th virtual seismic measurement position Yj. The value of any an element in A is "1" when the j-th virtual seismic measurement $X_j$ contributes to the i-th DAS measurement $B_{z_i}$. Otherwise, the value of the element is "0."

Example Flowchart

Figure 3:
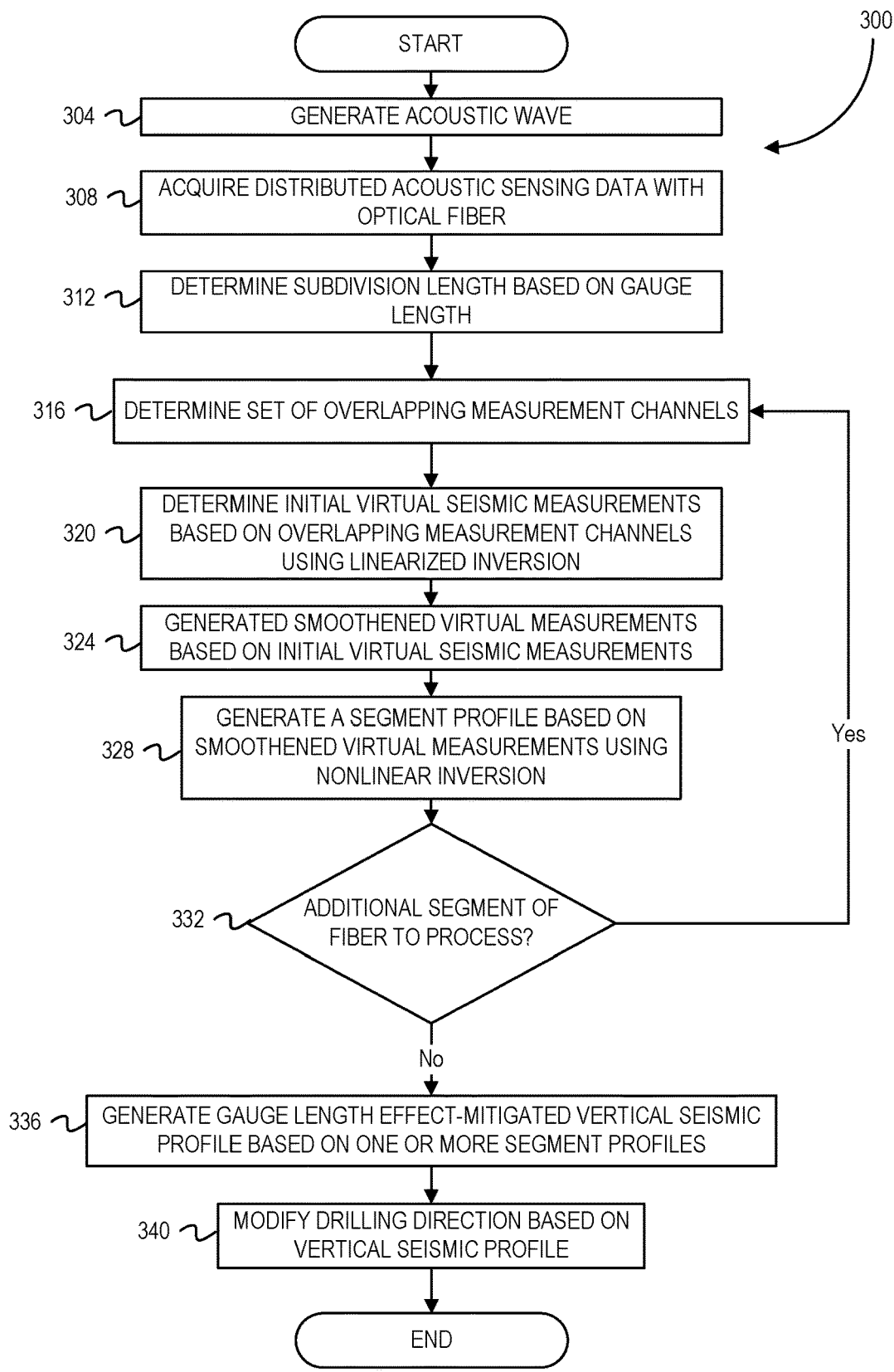
FIG. 3 is a flowchart of operations to generate a vertical seismic profile based on one or more segments of measured seismic data.

FIG. 3 is a flowchart of operations to generate a vertical seismic profile based on one or more segments of measured seismic data. FIG. 3 is a flowchart 300 of operations that includes operations that are described in reference to the onshore platform and optical fiber of FIG. 1. Operations of the flowchart 300 start at block 304.

At block 304, an acoustic wave is generated. In some embodiments, with reference to FIG. 1, the acoustic wave can be generated using the seismic source 115 disposed at the formation surface 111. For example, the seismic source 115 can be remotely activated to emit an acoustic wave with a particular amplitude and/or frequency. In some embodiments, the seismic source 115 can emit acoustic waves at varying frequencies, amplitudes, and/or phases in series. Alternatively, the seismic source 115 can emit multiple acoustic waves at varying frequencies, amplitudes, and/or phases in parallel. Alternatively, or in addition, mechanical activity such as drilling from the drill bit 109 can generate acoustic waves. In other embodiments, drilling from a drill bit in a different wellbore, hydraulic stimulation treatments, or well treatment operations in a second wellbore can generate acoustic waves.

At block 308, distributed acoustic sensing (DAS) data is acquired with an optical fiber. With reference to FIG. 1, acoustic waves induce light interference in the optical fiber cable 113 that is acquired (measured) by the DAS system 112. The DAS system 112 can be set to measure data at various gauge lengths. For example, the DAS system 112 can be set to measure DAS data at a gauge length of 20 feet (approximately 6.096 meters). Alternatively, the DAS system 112 can be set to measure DAS data at various other measurement lengths, such as gauge lengths of 5 feet (approximately 1.524 meters), 10 feet (approximately 3.048 meters), or 40 feet (approximately 12.192 meters). Each of the measurements are acquired at a corresponding gauge length and can be re-acquired at a different gauge length after modifying settings in the DAS system 112.

At block 312, the subdivision length is determined based on the gauge length. The subdivision lengths can be any length less than the gauge length. In some embodiments, the subdivision can be set to be equal to half of the gauge length. In other embodiments, the subdivision length can be set to a pre-defined length. For example, the subdivision length can be set to a pre-defined length of one meter.

At block 316, a set of overlapping measurement channels is determined. At least one portion of each channel in the set of overlapping measurement channels overlaps with at least one other channel in the set of overlapping measurement channels. For example, a set of overlapping measurement channels can include a first measurement channel with a section that spans from 890 meters to 910 meters and a second measurement channel with a section that spans from 891 meters to 911 meters. In this case, the first measurement channel and second measurement channel overlap in the range from 891 meters to 910 meters. For multiple iterations across the entire length of an optical fiber for a single timestep, a set of overlapping measurement channels can be determined by incrementally moving along the length of the optical fiber. For example, after a first set of measurement channels centered in the range from 900 meters to 920 meters is determined for a first iteration, a new set of measurement channels centered in the range 920 meters to 940 meters is determined for a second iteration.

At block 320, initial virtual seismic measurements are determined based on the overlapping measurement channels using linearized inversion. The linear system can be based on linearized forms of Equation 3, wherein each seismic measurement $B_{zi}$ corresponds with one of the overlapping measurement channels. For example, with respect to FIG. 2, the linear system 232 can represent a set of 20 overlapping measurement channels spanning 40 one-meter subdivisions in the optical fiber 204. As another example, for a set of three overlapping measurement channels having a gauge length of 10 meters with respective measurements of −1.04, 10.17, and 5.38, each measurement channel can be divided into two 5-meter-long subdivisions and formed into a linear system. The linear system can be arranged as shown below in Equation 4:

$$\begin{bmatrix} 1 & 1 & 0 & 0 \\ 0 & 1 & 1 & 0 \\ 0 & 0 & 1 & 1 \end{bmatrix} \begin{bmatrix} x_1 \\ x_2 \\ x_3 \\ x_4 \end{bmatrix} = \begin{bmatrix} -1.04 \\ 10.17 \\ 5.38 \end{bmatrix} \quad (4)$$

In addition to using the values of $B_{zi}$ that include single measurement channels, the linear system can be modified to generate an overdetermined linear system. For example, linear combinations of a first pair including the first measurement channel and the last measurement channel and a second pair including the first measurement channel and the second measurement channel can be used to modify the linear system represented by Equation 4 into the system represented by Equation 5:

$$\begin{bmatrix} 1 & 1 & 0 & 0 \\ 0 & 1 & 1 & 0 \\ 0 & 0 & 1 & 1 \\ 1 & 1 & 1 & 1 \\ 1 & 2 & 1 & 0 \end{bmatrix} \begin{bmatrix} x_1 \\ x_2 \\ x_3 \\ x_4 \end{bmatrix} = \begin{bmatrix} -1.04 \\ 10.17 \\ 5.38 \\ 4.34 \\ 9.13 \end{bmatrix} \quad (5)$$

Linearized inversion for inverting the linear system can include Tikhonov regularization. Incorporating Tikhonov regularization into the linearized inversion can smooth the initial virtual seismic measurements to mitigate some of the error caused by an ill-posed linear system. The linear system can be ill-posed due to missing measurements and perturbations in the optical fiber, either of which can occur and can be difficult to account for in a subsurface environment.

At block 324, smoothed virtual measurements are generated based on the initial virtual seismic measurements. In some embodiments, secondary regularization can convert the initial virtual seismic measurements to smoothed signals. As one example, an exponential smoothing algorithm can be applied to smooth the initial virtual seismic measurements. As a second example, multiple measurements of the same subdivision can be smoothed using a Kalman filter.

At block 328, a segment profile is generated based on the smoothed virtual measurements using a nonlinear inversion. In some embodiments, the nonlinear inversion can provide virtual seismic measurements that are more accurate than the initial virtual seismic measurements. For example, the nonlinear inversion can be a Levenberg-Marquadt inversion, wherein the smoothed signal is used as an initial guess of the Levenberg-Marquadt inversion. Alternative embodiments can apply the nonlinear inversion directly to the initial virtual seismic measurements determined at block 320 and can use various other nonlinear inversions such as conjugate gradient and genetic algorithms.

At block 332, a determination is made of whether additional segments of optical fiber are to be processed. In some embodiments, additional segments of optical fiber cable are to be processed until the complete seismic profile includes at least one measurement for each subdivision of an optical fiber. Alternatively, some embodiments can determine that no additional segments of the optical fiber are to be processed when a seismic profile having a target depth interval includes at least one measurement for each subdivision in the target depth interval, wherein the target depth interval is less than the length of the optical fiber. If an additional segment of the optical fiber is to be processed, operations of the flowchart 300 return to block 316. Otherwise, operations of the flowchart 300 continue at block 336.

At block 336, a gauge length effect (GLE)-mitigated vertical seismic profile (VSP) is generated based on the one or more segment profiles. The GLE-mitigated VSP can comprise each of the previously-determined segment profiles. For example, the GLE-mitigated VSP can comprise virtual measurements in a first segment profile between the 100 meter position and the 140 meter position and a second segment profile between the 140 meter position and the 180 meter position. In some embodiments, the GLE-mitigated VSP can be processed with a signal threshold, wherein a binary subdivision value is set to "1" if the corresponding virtual seismic measurement is greater than a threshold value and "0" otherwise. The threshold can be set at a pre-determined signal value and based on a user-defined level of strain. For example, it can be known that a signal value greater than 25 results in a strain exceeding a target localized strain greater than 0.001, and the threshold can be set to 25. Alternatively, the threshold can be based on a pre-defined normalized value. For example, after normalization, the threshold can be set to 0.5 to capture all signals greater than 50% of the maximum value.

At block 340, a drilling operation is modified based on the vertical seismic profile. For example, with reference to FIG. 1, a GLE-mitigated VSP can indicate the presence of a geological feature such as a fault and the drilling by the drill bit 109 can be stopped when the drill bit 109 approaches the fault. As a second example, a VSP can indicate the presence of a geological feature such as a series of fractures, and the direction of the drill bit 109 can be modified to move towards the series of fractures.

Example Data

Figure 4:
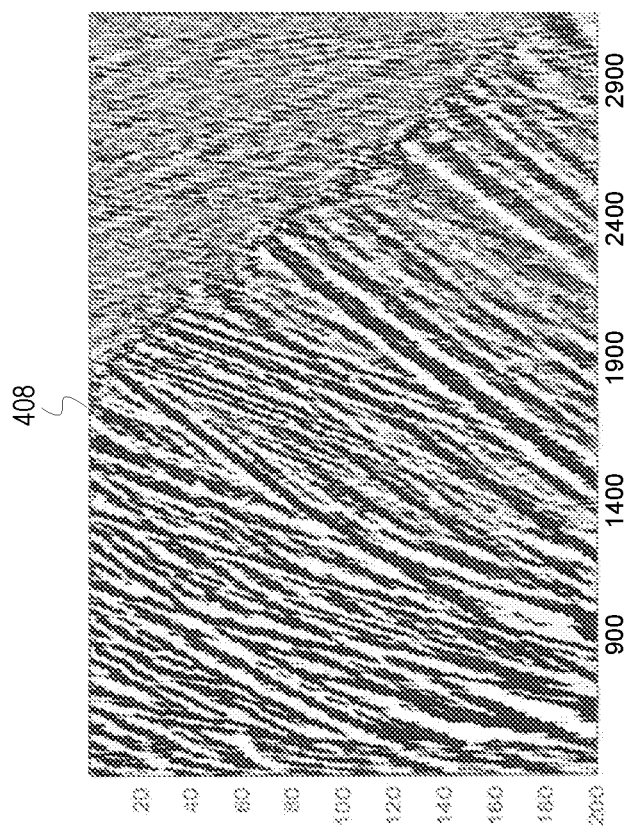
FIG. 4 depicts vertical seismic profiles with gauge length effect mitigation and without gauge length effect mitigation.
Figure 4:
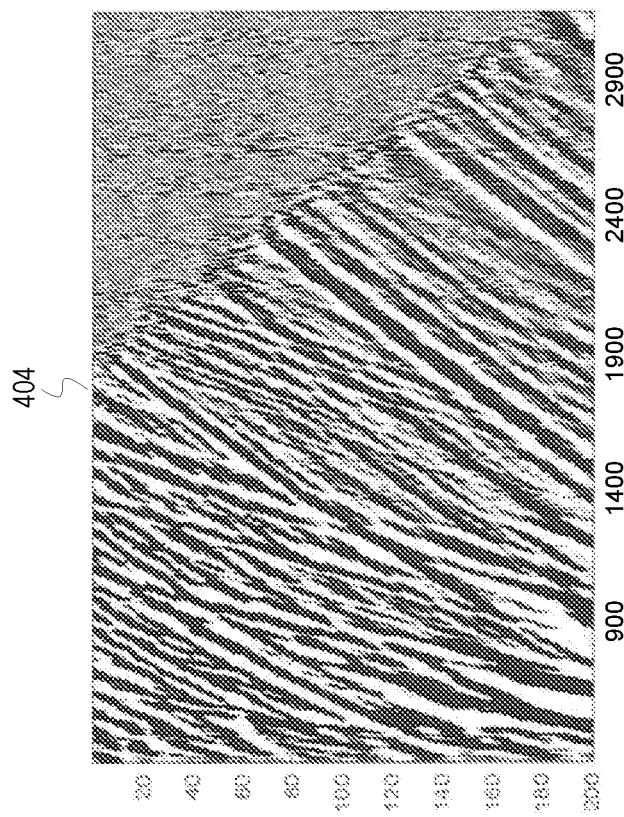

FIG. 4 depicts vertical seismic profiles with gauge length effect mitigation and without gauge length effect mitigation. An original VSP plot 404 shows data that does not include GLE mitigation using a gauge length of 20 meters. A processed VSP plot 408 shows data that includes GLE mitigation using a gauge length of 20 meters, wherein the processing augments the processed SP plot and allows it to show data using a subdivision length (i.e. virtual gauge length) of one meter. GLE mitigation allows the processed VSP plot 408 to show clearer images with greater detail in comparison to the original VSP plot 404. For example, the processed VSP plot 408 has less blurring of measurements and greater detail in the subsurface compared to the original VSP plot 404.

Figure 5:
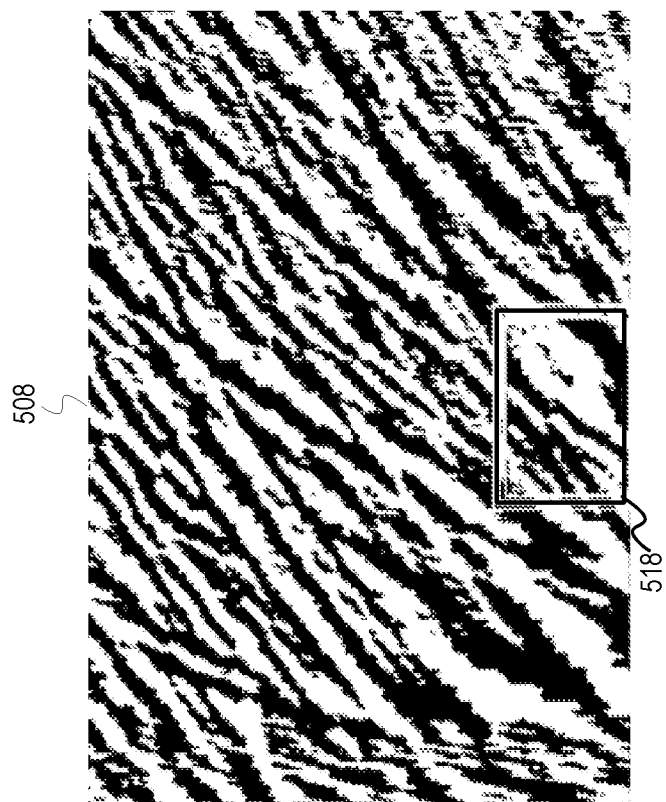
FIG. 5 depicts zoomed-in vertical seismic profiles with gauge length effect mitigation and without gauge length effect mitigation.
Figure 5:
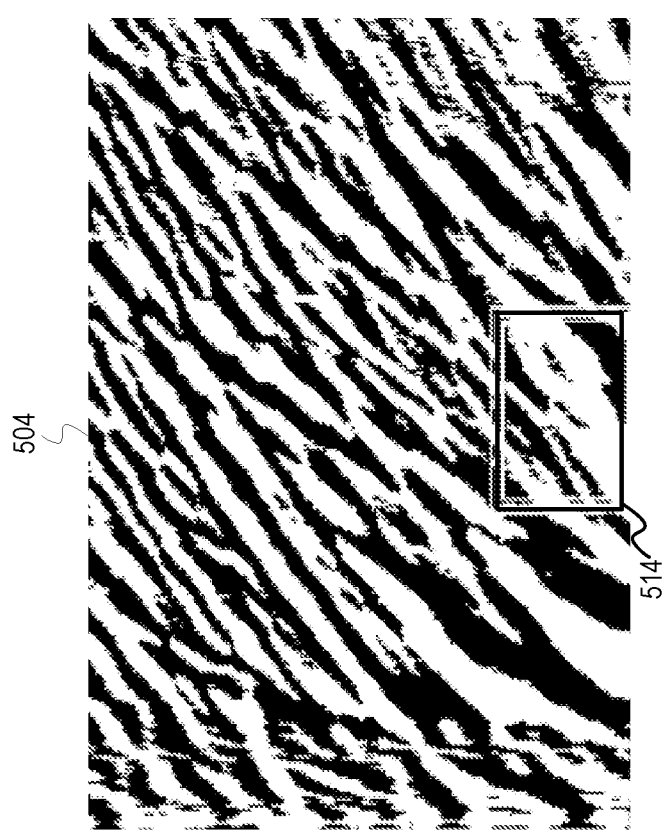

FIG. 5 depicts zoomed-in vertical seismic profiles with gauge length effect mitigation and without gauge length effect mitigation. With reference to FIG. 4, an original zoomed-in VSP plot 504 shows zoomed-in data from the original VSP plot 404 and does not include GLE mitigation using a gauge length of 20 meters. With further reference to FIG. 4, a processed zoomed-in VSP plot 508 shows zoomed-in data from the original VSP plot 408 and includes GLE mitigation using a gauge length of 20 meters, wherein the processing augments the processed SP plot and allows it to show data using a subdivision length (i.e. virtual gauge length) of one meter. GLE mitigation allows the processed zoomed-in VSP plot 508 to show clearer images with greater detail in comparison to the original zoomed-in VSP plot 504. For example, the boxed region 518 from the processed zoomed-in VSP plot 508 shows less blurring, greater detail of measurements, greater clarity, and greater continuity in the subsurface compared to the boxed region 514 from the original zoomed-in VSP plot 504.

Figure 6:
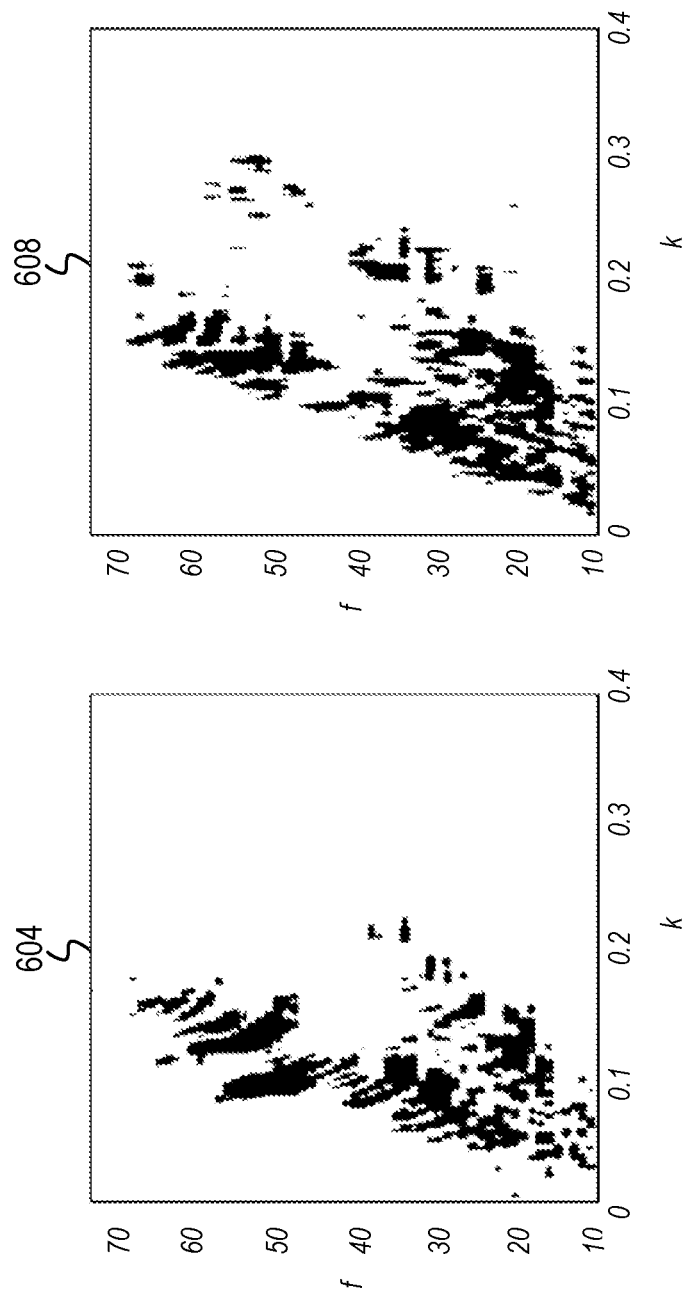
FIG. 6 depicts plots of spectral fidelity with gauge length effect mitigation and without gauge length effect mitigation.

FIG. 6 depicts plots of spectral fidelity with gauge length effect mitigation and without gauge length effect mitigation. An original spectral fidelity plot 604 shows data that does not include GLE mitigation using a gauge length of 20 meters. A processed spectral fidelity plot 608 shows data that includes GLE mitigation using a gauge length of 20 meters, wherein the processed spectral fidelity plot 608 uses a subdivision length of one meter. The x-axes of both plots represent the wavenumber component k. The y-axes of both plots represent the frequency f. The data in both the original spectral fidelity plot 604 and the processed spectral fidelity plot 608 has been normalized to scale from 0 to 1 and all values greater than 0.25 after normalization is shown in black for both plots.

The increased number of points greater than 0.25 shown in the processed spectral fidelity plot 608 indicate that normalized amplitudes have increased. This amplitude increase is a result of the greater spatial resolution provided by a GLE mitigation process. For example, many of the wavenumber components greater than 0.25 have amplitude increases greater than or equal to 25%. This amplitude increase can be due to the GLE mitigation operations disclosed above and can provide information for determining drilling operations and well treatment operations.

Example Computer Device

Figure 7:
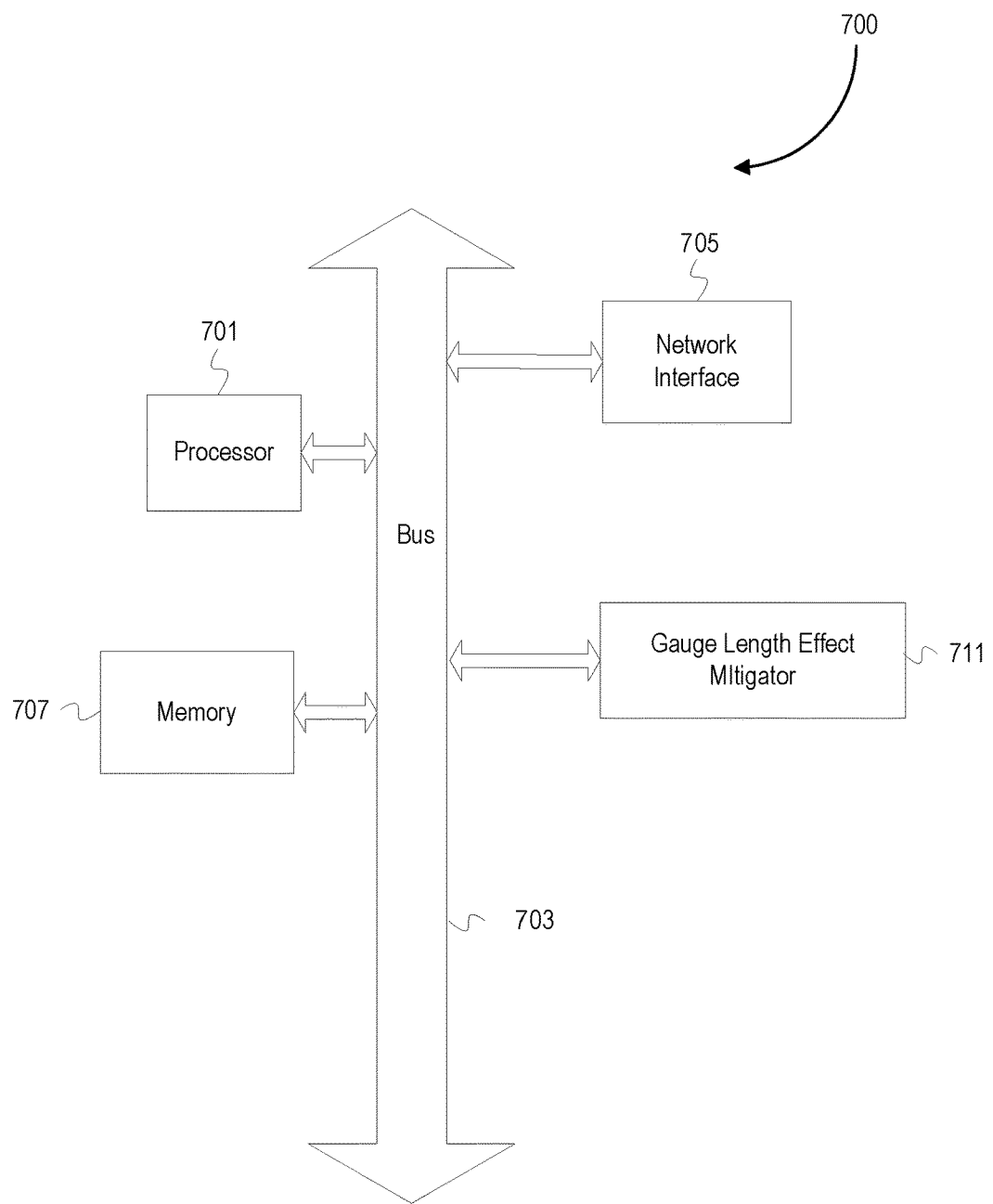
FIG. 7 is schematic diagram of an example computer device.

FIG. 7 is schematic diagram of an example computer device. A computer device 700 includes a processor 701 (possibly including multiple processors, multiple cores, multiple nodes, and/or implementing multi-threading, etc.). The computer device 700 includes a memory 707. The memory 707 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 700 also includes a bus 703 (e.g., PCI, ISA, PCI-Express, Hyper-Transport® bus, InfiniBand® bus, NuBus, etc.) and a network interface 705 (e.g., a Fiber Channel interface, an Ethernet interface, an internet small computer system interface, SONET interface, wireless interface, etc.).

The computer device 700 includes a gauge length effect mitigator 711. The gauge length effect mitigator 711 can perform one or more operations described above. For example, the gauge length effect mitigator 711 can determine a GLE-mitigated vertical seismic profile based on collected DAS measurements. Additionally, the gauge length effect mitigator 711 can instruct a well treatment operation or drilling operation in response to geological features or properties indicated by the GLE-mitigated vertical seismic profile.

Any one of the previously described functionalities can be partially (or entirely) implemented in hardware and/or on the processor 701. For example, the functionality can be implemented with an application specific integrated circuit, in logic implemented in the processor 701, in a co-processor on a peripheral device or card, etc. Further, realizations can include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 can be coupled to the processor 701. The computer device 700 can be a device at the surface and/or integrated into component(s) in the wellbore. For example, with reference to FIG. 1, the computer device 700 can be incorporated in the control unit 110 and/or a computer at a remote location.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store, a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine readable medium that can direct a machine to function in a particular manner, such that the instructions stored in the machine readable medium produce an article of manufacture including instructions which implement the function/act specified in the flowchart and/or block diagram block or blocks.

Plural instances can be provided for components, operations or structures described herein as a single instance. Finally, boundaries between various components, operations and data stores are somewhat arbitrary, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

Embodiment 1

A method to generate a vertical seismic profile, the method comprising: acquiring a set of distributed acoustic sensing measurements from a set of overlapping measurement channels on an optical fiber, wherein each of the set of distributed acoustic sensing measurements are measured at a gauge length; generating a set of virtual seismic measurements corresponding with subdivisions in the set of overlapping measurement channels based on the set of distributed acoustic sensing measurements; and generating the vertical seismic profile based on the set of virtual seismic measurements.

Embodiment 2

The method of Embodiment 1, wherein generating the set of virtual seismic measurements comprises: generating an initial set of virtual seismic measurements based on the set of distributed acoustic sensing measurements using a linearized inversion; and generating the set of virtual seismic measurements based on the initial set of virtual seismic measurements using a nonlinear inversion.

Embodiment 3

The method of Embodiments 1 or 2, further comprising smoothing the initial set of virtual seismic measurements.

Embodiment 4

The method of any of Embodiments 1-3, wherein generating the set of virtual seismic measurements comprises generating subsets of virtual seismic measurements, and wherein at least one sum of the subsets of virtual seismic measurements is equal to one measurement of the set of distributed acoustic sensing measurements.

Embodiment 5

The method of any of Embodiments 1-4, wherein a same gauge length is used for each of the set of distributed acoustic sensing measurements.

Embodiment 6

The method of any of Embodiments 1-5, wherein a total segment length of the subdivisions is less than a total length of the optical fiber, and wherein each subdivision is shorter than the gauge length.

Embodiment 7

The method of any of Embodiments 1-6, further comprising emitting one or more acoustic waves by actuating a seismic source disposed at a formation surface, wherein the one or more acoustic waves are received by the optical fiber to acquire the set of distributed acoustic sensing measurements.

Embodiment 8

One or more non-transitory machine-readable media comprising program code to generate a vertical seismic profile, the program code to: acquire a set of distributed acoustic sensing measurements from a set of overlapping measurement channels on an optical fiber, wherein each of the set of distributed acoustic sensing measurements are measured at a gauge length; generate a set of virtual seismic measurements corresponding with subdivisions in the set of overlapping measurement channels based on the set of distributed acoustic sensing measurements; and generate the vertical seismic profile based on the set of virtual seismic measurements.

Embodiment 9

The one or more non-transitory machine-readable media of Embodiment 8, wherein the program code to generate the set of virtual seismic measurements comprises program code to: generate an initial set of virtual seismic measurements based on the set of distributed acoustic sensing measurements using a linearized inversion; and generate the set of virtual seismic measurements based on the initial set of virtual seismic measurements using a nonlinear inversion.

Embodiment 10

The one or more non-transitory machine-readable media of Embodiments 8 or 9, further comprising program code to smooth the initial set of virtual seismic measurements.

Embodiment 11

The one or more non-transitory machine-readable media of any of Embodiments 8-10, wherein the program code to generate the set of virtual seismic measurements comprises program code to generate subsets of virtual seismic measurements, and wherein at least one sum of the subsets of virtual seismic measurements is equal to one measurement of the set of distributed acoustic sensing measurements.

Embodiment 12

The one or more non-transitory machine-readable media of any of Embodiments 8-11, wherein a same gauge length is used for each of the set of distributed acoustic sensing measurements.

Embodiment 13

The one or more non-transitory machine-readable media of any of Embodiments 8-12, wherein a total segment length of the subdivisions is less than a total length of the optical fiber, and wherein each subdivision is shorter than the gauge length.

Embodiment 14

The one or more non-transitory machine-readable media of any of Embodiments 8-13, further comprising program code to emit one or more acoustic waves by actuating a seismic source disposed at a formation surface, wherein the one or more acoustic waves are received by the optical fiber to acquire the set of distributed acoustic sensing measurements.

Embodiment 15

A system to generate a vertical seismic profile, the system comprising: an optical fiber to be positioned in a wellbore; a processor; and a machine-readable medium having program code executable by the processor to cause the processor to, acquire a set of distributed acoustic sensing measurements from a set of overlapping measurement channels on the optical fiber, wherein each of the set of distributed acoustic sensing measurements are measured at a gauge length, generate a set of virtual seismic measurements corresponding with subdivisions in the set of overlapping measurement channels based on the set of distributed acoustic sensing measurements, and generate the vertical seismic profile based on the set of virtual seismic measurements.

Embodiment 16

The system of Embodiment 15, wherein the machine-readable medium comprises program code executable by the processor to: generate an initial set of virtual seismic measurements based on the set of distributed acoustic sensing measurements using a linearized inversion; and generate the set of virtual seismic measurements based on the initial set of virtual seismic measurements using a nonlinear inversion.

Embodiment 17

The system of Embodiments 15 or 16, wherein the machine-readable medium comprises program code executable by the processor to smooth the initial set of virtual seismic measurements.

Embodiment 18

The system of any of Embodiments 15-17, wherein the linearized inversion comprises Tikhonov regularization.

Embodiment 19

The system of any of Embodiments 15-18, wherein a same gauge length is used for each of the set of distributed acoustic sensing measurements, and wherein each subdivision is shorter than the same gauge length.

Embodiment 20

The system of any of Embodiments 15-19, further comprising a seismic source disposed at a formation surface, wherein the machine-readable medium comprises program code executable by the processor to actuate the seismic source to emit one or more acoustic waves, wherein the one or more acoustic waves are received by the optical fiber to acquire the set of distributed acoustic sensing measurements.

What is claimed is:

1. A method to generate a vertical seismic profile, the method comprising:
   acquiring a set of distributed acoustic sensing measurements from a set of overlapping measurement channels on an optical fiber, wherein each of the set of distributed acoustic sensing measurements are measured at a gauge length;
   generating a set of virtual seismic measurements corresponding with subdivisions in the set of overlapping measurement channels based on the set of distributed acoustic sensing measurements; and
   generating the vertical seismic profile based on the set of virtual seismic measurements.

2. The method of claim 1, wherein generating the set of virtual seismic measurements comprises:
   generating an initial set of virtual seismic measurements based on the set of distributed acoustic sensing measurements using a linearized inversion; and
   generating the set of virtual seismic measurements based on the initial set of virtual seismic measurements using a nonlinear inversion.

3. The method of claim 2, further comprising smoothing the initial set of virtual seismic measurements.

4. The method of claim 1, wherein generating the set of virtual seismic measurements comprises generating subsets of virtual seismic measurements, and wherein at least one sum of the subsets of virtual seismic measurements is equal to one measurement of the set of distributed acoustic sensing measurements.

5. The method of claim 1, wherein a same gauge length is used for each of the set of distributed acoustic sensing measurements.

6. The method of claim 1, wherein a total segment length of the subdivisions is less than a total length of the optical fiber, and wherein each subdivision is shorter than the gauge length.

7. The method of claim 1, further comprising emitting one or more acoustic waves by actuating a seismic source disposed at a formation surface, wherein the one or more acoustic waves are received by the optical fiber to acquire the set of distributed acoustic sensing measurements.

8. One or more non-transitory machine-readable media comprising program code to generate a vertical seismic profile, the program code to:
   acquire a set of distributed acoustic sensing measurements from a set of overlapping measurement channels on an optical fiber, wherein each of the set of distributed acoustic sensing measurements are measured at a gauge length;
   generate a set of virtual seismic measurements corresponding with subdivisions in the set of overlapping measurement channels based on the set of distributed acoustic sensing measurements; and
   generate the vertical seismic profile based on the set of virtual seismic measurements.

9. The one or more non-transitory machine-readable media of claim 8, wherein the program code to generate the set of virtual seismic measurements comprises program code to:
   generate an initial set of virtual seismic measurements based on the set of distributed acoustic sensing measurements using a linearized inversion; and
   generate the set of virtual seismic measurements based on the initial set of virtual seismic measurements using a nonlinear inversion.

10. The one or more non-transitory machine-readable media of claim 9, further comprising program code to smooth the initial set of virtual seismic measurements.

11. The one or more non-transitory machine-readable media of claim 8, wherein the program code to generate the set of virtual seismic measurements comprises program code to generate subsets of virtual seismic measurements, and wherein at least one sum of the subsets of virtual seismic measurements is equal to one measurement of the set of distributed acoustic sensing measurements.

12. The one or more non-transitory machine-readable media of claim 8, wherein a same gauge length is used for each of the set of distributed acoustic sensing measurements.

13. The one or more non-transitory machine-readable media of claim 8, wherein a total segment length of the subdivisions is less than a total length of the optical fiber, and wherein each subdivision is shorter than the gauge length.

14. The one or more non-transitory machine-readable media of claim 8, further comprising program code to emit one or more acoustic waves by actuating a seismic source disposed at a formation surface, wherein the one or more acoustic waves are received by the optical fiber to acquire the set of distributed acoustic sensing measurements.

15. A system to generate a vertical seismic profile, the system comprising:
   an optical fiber to be positioned in a wellbore;
   a processor; and
   a machine-readable medium having program code executable by the processor to cause the processor to,
      acquire a set of distributed acoustic sensing measurements from a set of overlapping measurement channels on the optical fiber, wherein each of the set of distributed acoustic sensing measurements are measured at a gauge length,
      generate a set of virtual seismic measurements corresponding with subdivisions in the set of overlapping measurement channels based on the set of distributed acoustic sensing measurements, and
      generate the vertical seismic profile based on the set of virtual seismic measurements.

16. The system of claim 15, wherein the machine-readable medium comprises program code executable by the processor to:
   generate an initial set of virtual seismic measurements based on the set of distributed acoustic sensing measurements using a linearized inversion; and
   generate the set of virtual seismic measurements based on the initial set of virtual seismic measurements using a nonlinear inversion.

17. The system of claim 16, wherein the machine-readable medium comprises program code executable by the processor to smooth the initial set of virtual seismic measurements.

18. The system of claim 16, wherein the linearized inversion comprises Tikhonov regularization.

19. The system of claim 15, wherein a same gauge length is used for each of the set of distributed acoustic sensing measurements, and wherein each subdivision is shorter than the same gauge length.

20. The system of claim 15, further comprising a seismic source disposed at a formation surface, wherein the machine-readable medium comprises program code executable by the processor to actuate the seismic source to emit one or more acoustic waves, wherein the one or more acoustic waves are received by the optical fiber to acquire the set of distributed acoustic sensing measurements.

\* \* \* \* \*